(12) United States Patent
Lifson et al.

(10) Patent No.: US 6,993,920 B2
(45) Date of Patent: Feb. 7, 2006

(54) HEATER CYCLING FOR IMPROVED OIL RETURN

(75) Inventors: Alexander Lifson, Manlius, NY (US); Jason Scarcella, Cicero, NY (US)

(73) Assignee: Carrier Corporation, Suracuse, NY (US)

( * ) Notice: Subject to any disclaimer, the term of this patent is extended or adjusted under 35 U.S.C. 154(b) by 38 days.

(21) Appl. No.: 10/768,781

(22) Filed: Jan. 30, 2004

(65) Prior Publication Data

US 2005/0166616 A1 Aug. 4, 2005

(51) Int. Cl.
*F25B 29/00* (2006.01)
*F25B 31/00* (2006.01)

(52) U.S. Cl. .............. 62/173; 62/84; 62/193; 165/240; 165/267

(58) Field of Classification Search .......... 62/84, 62/155, 173, 192, 193, 468; 165/240, 267
See application file for complete search history.

(56) References Cited

U.S. PATENT DOCUMENTS

| 4,324,286 | A | * | 4/1982 | Brett | 165/202 |
| 6,260,366 | B1 | * | 7/2001 | Pan | 62/173 |
| 6,820,435 | B2 | * | 11/2004 | Anderson et al. | 62/202 |
| 6,860,114 | B2 | * | 3/2005 | Jacobsen | 62/196.4 |

* cited by examiner

*Primary Examiner*—Marc Norman
(74) *Attorney, Agent, or Firm*—Bachman & LaPointe, PC

(57) ABSTRACT

A method comprises the steps of (a) providing a refrigeration unit having a refrigerated or heated space and at least one measured operating parameter, (b) providing heat to the refrigerated space when the at least one measured operating parameter exceeds a first threshold, (c) terminating provision of heat when the at least one measured operating parameter exceeds a second threshold, and repeating steps b–c when the at least one operating parameter falls below the first threshold. In using this method, the unit can be operated continuously, with substantially higher refrigerant mass flow and evaporator pressure then in the prior art. Higher refrigerant mass flow rate and higher evaporator pressure improve oil return to the compressor, thus reducing the like hood of compressor damage due to oil pump out.

15 Claims, 1 Drawing Sheet

HEATER CYCLING FOR IMPROVED OIL RETURN

BACKGROUND OF THE INVENTION (1) Field of the Invention

The present invention relates to a method for improving oil return in a refrigeration unit.

(2) Description of the Related Art

With reference to FIG. 1, there is illustrated a refrigeration unit 10. Typically, a refrigerant/oil mixture travels in a circuit from the compressor 11 through the condenser 13 to an expansion device 19 then to an evaporator 15 and then to suction line 21 and finally back to the compressor 11. In instances wherein an operating refrigeration unit 10 carries perishable goods at low ambient temperatures, the amount of cooling required to maintain the cargo at a given temperature is quite minimal. In such instances, the amount of refrigerant traveling through the coil of the evaporator 15 and suction line 21 is substantially reduced. Such reduction in the amount of refrigerant results in the retention and logging of oil in the evaporator. This logging of oil in turn compromises oil return to the compressor and thus reduces the heat transfer effectiveness of the evaporator coil or in some instances can even lead to complete oil pump out from the compressor resulting in the compressor failure.

One possible solution to reduce or eliminate the logging of oil in the evaporator 15 or suction line 21 would be to cycle the entire refrigeration unit 10. Under such a scenario, the refrigeration unit 10 is periodically turned on and off. If the unit is allowed to cycle in on and off fashion, then when the unit is in the "on" mode then the amount of refrigerant traveling through the system is higher than if the unit had to operate continuously to maintain the same temperature of the refrigerated space. Unfortunately, cycling the entire refrigeration unit 10 can result in a scenario wherein it is difficult to control the temperature of the space to be refrigerated within relatively narrow bounds. In addition, if the compressor does not run continuously there are additional cycling losses due to frequent start/stops resulting in increased power consumption. Also compressor reliability may be compromised due to frequent start/stops. Continual running of the compressor 11 on another hand allows for better maintenance of the temperature of the space to be refrigerated within relatively narrow bounds, and may also improve compressor reliability and operating unit efficiency.

What is therefore needed is a method for operating a refrigeration unit 10 on a continuous basis with sufficient amount of refrigerant traveling through the system to prevent logging of oil in the evaporator 15. Preferably such a method would involve the continual operation of the compressor 11.

SUMMARY OF THE INVENTION

Accordingly, it is an object of the present invention to provide a method for improving oil return in a refrigeration unit while maintaining tight temperature control in the refrigerated space.

In accordance with the present invention, a method comprises the steps of (a) providing a refrigeration unit having a refrigerated or heated space and at least one measured operating parameter, (b) providing heat to the refrigerated space when the at least one measured operating parameter exceeds a first threshold, (c) terminating provision of heat when the at least one measured operating parameter exceeds a second threshold, and repeating steps b–c when the at least one operating parameter falls below the first threshold.

In further accordance with the present invention, a refrigeration unit comprises a compressor for circulating a refrigerant/oil mixture through a refrigeration unit, a sensor for measuring an operating parameter, a heating element for providing heat to the refrigeration unit, and a controller for receiving the measured operating parameter and turning on and off the heating element in response thereto.

In further accordance with the present invention, a method comprises the steps of providing a refrigeration unit having a refrigerated space, and providing and terminating heat to the refrigerated space in a pulsed on and off mode.

In further accordance with the present invention, a method further comprises providing heat when the operating parameter has exceeded a time limit associated with a refrigerant system component that can be power cycled and can affect the operating parameter.

DETAILED DESCRIPTION

It is therefore an aspect of the present invention to provide a method for cycling the operation of heaters in proximity to a refrigeration unit 10 so as to increase refrigerant/oil mass flow through the evaporator. By turning on and off a heater 17, the refrigeration unit 10 is forced to run at a level which requires greater refrigerant/oil mass flow than would be required in the absence of the introduction of such heat. The heater is turned on and off based upon at least one continually monitored operating parameter of the refrigeration unit 10. The heating element 17 is turned on and off to maintain the value of the operating parameter between two predefined threshold levels. By cycling a heating element 17 on and off in this manner, refrigerant/oil mass flow through the evaporator 15 is maintained at a level sufficient to substantially eliminate the logging of oil in the evaporator, thereby increasing the efficiency of the evaporator 15.

Figure 1:
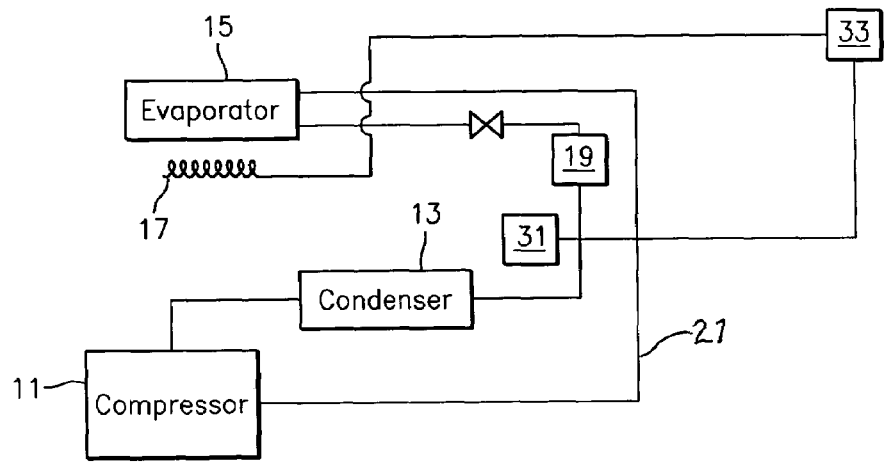
FIG. 1 A diagram of the refrigeration unit of the present invention.

With reference to FIG. 1, there is illustrated the refrigeration unit 10 of the present invention incorporating the heating element 17. Heating element 17 may be of any construction sufficient to introduce heat into the volume of space to be cooled by the refrigeration unit 10. In some refrigeration units 10, there are typically installed heating elements near enough to the evaporator coils to prevent the formation of ice upon the coils. In the instance that there is provided such a heating element 17 in proximity to the evaporator 15, it is preferable to cycle such a heating element 17 using the method of the present invention. However, the present invention is not limited to either the placement or the construction of any particular heating element 17. Rather, the present invention is drawn broadly to incorporate any and all heating elements 17 capable of producing heat and located within a space to be cooled or monitored by refrigeration unit 10.

As noted above, there are advantages with regards to the operating efficiency and reliability which arise from the continual running of the compressor. Cycling the heating element 17 with the compressor running therefore produces the beneficial effects of improving oil return to the compressor 11 while improving the heat transfer effectiveness of the evaporator 15 and avoiding cycling losses associated with frequent start/stops of the unit As additional heat is added, it becomes necessary to increase the refrigerant mass flow to provide additional cooling to compensate for the heat addition. The mass flow of refrigerant is normally increased by increasing the suction pressure by opening the suction modulation valve that regulates the amount of suction throttling. Higher pressure in turn improves the oil return to the compressor 1. This occurs, as higher pressure tends to drive more refrigerant into the refrigerant/oil mixture. As a result, the viscosity of the refrigerant/oil mixture is reduced as the concentration of the refrigerant in the mixture is increased. As a result both higher refrigerant mass flow and reduced oil viscosity, make it easier to drag the oil along the tubes by the refrigerant, thus the oil return to the compressor 11 is improved. The continual running of the compressor with the increased mass flow of the refrigerant additionally decreases the super heat of the refrigerant as it leaves the evaporator, as less suction throttling is required. The lower super heat also plays an important role in reducing the viscosity of the oil in the superheated region of the evaporator and adjacent suction piping, the reduced oil viscosity in this section of the system also contributes to better oil return to the compressor. The reduction of oil viscosity in the superheated section occurs as a result of less refrigerant being boiled off from the oil mixture in this superheated region. Once again, the reduced oil viscosity improves the oil return to the compressor 11. Stated differently, the heater can be pulsed in on/off fashion to allow the unit to operate continuously without danger of logging oil in the evaporator or suction line located between the evaporator and compressor.

Figure 2:
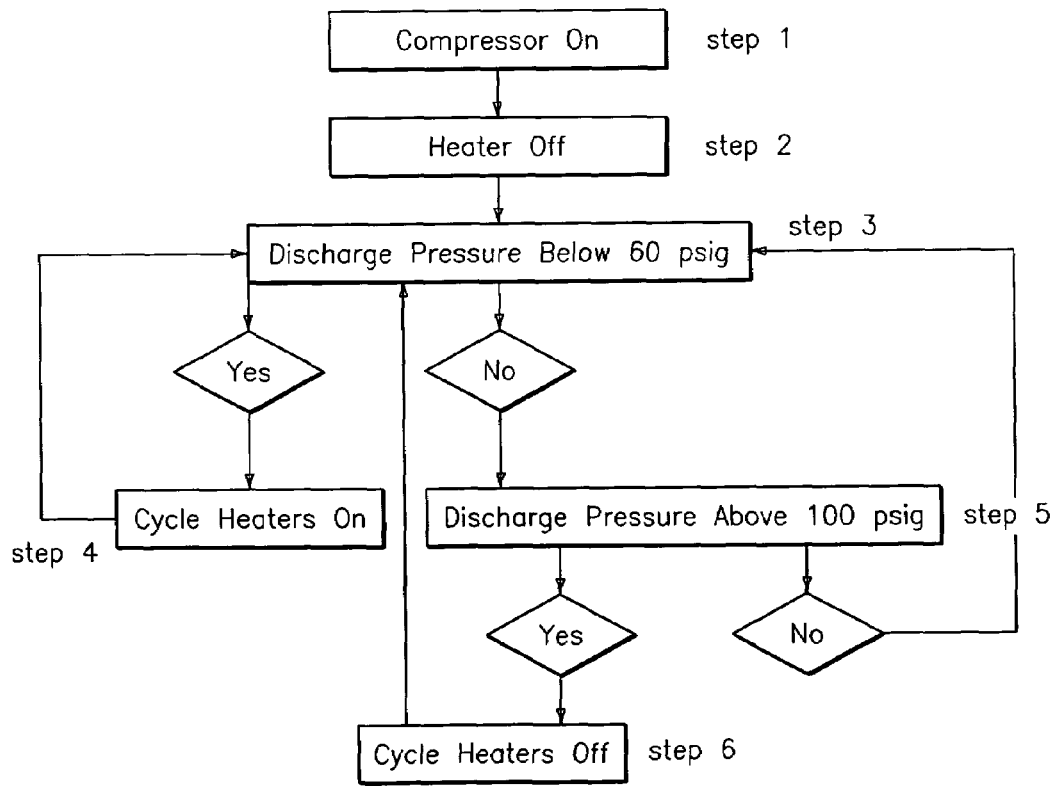
FIG. 2 A logic diagram of the method of heater cycling of the present invention.

With reference to FIG. 2, there is illustrated a logic diagram detailing the method of cycling the heaters of the present invention. At step 1, the compressor 11 is turned on. In step 2, the heater is off. Step 1 and step 2 therefore represent the initialization component of the refrigeration unit 10 wherein the compressor 11 is turned on while the heating element 17 is maintained at an off position. At step 3, a decision is made whether to cycle the heating element 17. At step 3, a reading is made of an operating parameter of the refrigeration unit 10 and a comparison of the read operating parameter is made to a predefined lower threshold value. The reading of the operating parameter is performed by a parameter sensor 31 configured to read a desired operating parameter and communicate the reading to a controller 33. Controller 33 is any digital computational device or analog circuitry configured to receive readings from at least one parameter sensor 31 and, acting upon such receipt, to cycle heating element 17. In the present example, the operating parameter chosen is the discharge pressure from the evaporator 15 and lower threshold value is 60 psi. The selection of the discharge pressure for the operating parameter and 60 psi for the lower threshold value is illustrated for exemplary purposes only. In a preferred embodiment, the lower threshold value is chosen to be at least approximately 60 psi and the upper threshold value is chosen to be less than approximately 100 psi. While such an operating parameter and lower threshold value represent one preferred embodiment, as noted above, the operating parameter may be chosen from numerous operating parameters including, but not limited to, discharge pressure, suction pressure, discharge temperature, suction temperature, pressure ratio, evaporator saturated temperature, condenser saturated temperature, ambient temperature. The operating parameter can also simply include a predetermined time interval when the heater is operating at ON position and predetermined time interval when the heater is operating in OFF position. The predetermined time interval for ON and OFF heater operation can be changed or adjusted based on other measured unit operating conditions. The operating parameter must also be in steady state condition to avoid rapid cycling of the heaters. Also steady state must be established to avoid inappropriate initiation of heat. Similarly, depending on the operating parameter chosen, the lower threshold value and upper threshold value will vary. Returning to the present example, at step 3, the discharge pressure is measured and compared to the lower threshold value of 60 psi. In the event that the discharge pressure is below 60 psi, the heating element 17 is cycled on at step 4 and step 3 is repeated. Step 3 and step 4 continue to be repeated until the discharge pressure reaches 60 psi. Once the discharge pressure reaches 60 psi in step 3, step 5 is performed. At step 5, a reading is taken of the discharge pressure operating parameter to see if it is above an exemplary upper threshold of 90 psi. Like the lower threshold value of 60 psi, 100 psi is chosen for exemplary purposes. As long as the discharge pressure is not above 100 psi, step 3 is performed. Step 3 and step 5 are then repeated in a loop until the discharge pressure reaches 100 psi. Once the discharge pressure measured in step 5 exceeds 100 psi, step 6 is performed. In step 6, the heating element 17 is cycled off and step 3 is performed. Once the heating element 17 is cycled off, the discharge pressure will begin to decrease. In the present example, it will continue to decrease until it dips below 60 psi at step 3. At this point, step 4 is performed and the heating element 17 is cycled on once again. In this manner, the discharge pressure is maintained between 60 and 100 psi through a process of cycling the heating element 17 on and off as required.

It is apparent that there has been provided in accordance with the present invention a a method for improving oil return in a refrigeration unit which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A method comprising the steps of:
   (a) providing a refrigeration unit having a refrigerated or heated space and at least one measured operating parameter;
   (b) providing heat to said refrigerated space when said at least one measured operating parameter exceeds a first threshold;
   (c) terminating provision of heat when said at least one measured operating parameter exceeds a second threshold; and
   repeating steps b–c when said at least one operating parameter falls below said first threshold.

2. The method of claim 1 wherein said providing heat comprises selecting said at least one operating parameter from the group consisting of discharge pressure, suction pressure, discharge temperature, suction temperature, pressure ratio, evaporator saturated temperature, condenser saturated temperature, ambient temperature, and operating time interval of said refrigeration unit.

3. The method of claim 1 wherein said first or second threshold is varied based on said at least one measured operating parameter.

4. The method of claim 1 wherein said step of providing heat comprises providing said heat when a discharge pressure exceeds a first threshold of at least approximately 60 psi.

5. The method of claim 1 wherein said step of providing heat comprises terminating provision of said heat when a discharge pressure exceeds a second threshold of at least approximately 100 psi.

6. The method of claim 1 wherein said step of providing heat comprises providing said heat when the operating parameter has exceeded a time limit associated with a refrigerant system component that can be power cycled and can affect said operating parameter.

7. The method of claim 1 wherein said step of providing heat comprises turning on or off a heating element.

8. The method of claim 7 wherein said step of turning on or off said heating element comprises the additional step of placing said heating element in space to be cooled or heated by said refrigeration unit.

9. The method of claim 7 wherein said step of turning on or off said heating element comprises the additional step of placing said heating element in an area to be monitored by said refrigeration unit.

10. The method of claim 7 wherein said turning on said heating element comprises turning on said heating element located a distance from an evaporator coil sufficient to permit defrosting of said evaporator coil.

11. The method of claim 1 wherein said providing and terminating said heat is performed to provide for continuous operation of a compressor of said refrigeration unit.

12. A refrigeration unit comprising:
a compressor for circulating a refrigerant/oil mixture through a refrigeration system to cool a refrigerated space,
a sensor for measuring an operating parameter indicative of load on the compressor;
a heating element for providing heat to said refrigerated space and
a controller for receiving said measured operating parameter and turning on and off said heating element in response thereto, wherein said controller is programmed to turn said heating element on when said measured operating parameter indicates load on the compressor is below a first threshold, and to turn said heating element off when said measured operating parameter indicates load on the compressor is above a second threshold which is greater than said first threshold, whereby the compressor can be operated substantially continuously at low loads so as to maintain circulation of the refrigerant/oil mixture.

13. The refrigeration unit of claim 12 wherein said operating parameter is selected from the group consisting of discharge pressure, suction pressure, discharge temperature, suction temperature, pressure ratio, evaporator saturated temperature, condenser saturated temperature, ambient temperature, and operating time interval of said refrigeration unit.

14. A method comprising the steps of:
providing a refrigeration unit having a refrigerated space; and
providing and terminating heat to said refrigerated space in a pulsed on and off mode based upon a measured operating parameter which is indicative of load on the refrigeration unit so as to maintain substantially continuous operation of said refrigeration unit at loads which are less than a threshold load.

15. A method comprising the steps of:
(a) providing a refrigeration unit having a refrigerated or heated space;
(b) measuring at least one operating parameter which is indicative of load on the refrigerant unit;
(c) providing heat to said refrigerated space when said at least one measured operating parameter indicates load which is less than a first threshold;
(d) terminating provision of heat when said at least one measured operating parameter indicates load which exceeds a second threshold which is greater than the first threshold; and
repeating steps b–d when said at least one operating parameter indicates load which is below said first threshold.

* * * * *